(12) United States Patent
Donazzi et al.

(10) Patent No.: US 6,806,418 B2
(45) Date of Patent: Oct. 19, 2004

(54) METHOD OF SCREENING THE MAGNETIC FIELD GENERATED BY AN ELECTRICAL POWER TRANSMISSION LINE, AND ELECTRICAL POWER TRANSMISSION LINE

(75) Inventors: Fabrizio Donazzi, Milan (IT); Paolo Maioli, Crema (IT)

(73) Assignee: Pirelli Cavi E Sistemi S.p.A., Milan (IT)

( * ) Notice: Subject to any disclaimer, the term of this patent is extended or adjusted under 35 U.S.C. 154(b) by 0 days.

(21) Appl. No.: 10/296,615

(22) PCT Filed: May 21, 2001

(86) PCT No.: PCT/EP01/05784

§ 371 (c)(1),
(2), (4) Date: May 1, 2003

(87) PCT Pub. No.: WO01/93394

PCT Pub. Date: Dec. 6, 2001

(65) Prior Publication Data

US 2003/0168230 A1 Sep. 11, 2003

Related U.S. Application Data

(60) Provisional application No. 60/209,483, filed on Jun. 6, 2000.

(30) Foreign Application Priority Data

May 31, 2000 (EP) .............................. 00111645

(51) Int. Cl.⁷ ............................. H01B 7/34; H01B 7/00
(52) U.S. Cl. .................. 174/36; 174/110 R; 174/113 R
(58) Field of Search .............................. 174/36, 110 R, 174/113 R, 116, 118, 120 R, 121 R (56) References Cited

U.S. PATENT DOCUMENTS

| | | | | |
|---|---|---|---|---|
| 2,787,651 A | * | 4/1957 | Lapsley | ........................ 174/32 |
| 3,160,702 A | * | 12/1964 | Lapsley | ........................ 174/32 |
| 3,594,492 A | * | 7/1971 | Bahder et al. | ................. 174/36 |
| 3,755,650 A | * | 8/1973 | Ando | ........................ 392/469 |
| 4,096,351 A | * | 6/1978 | Wargin et al. | ........... 174/102 R |
| 4,334,142 A | * | 6/1982 | Blackmore | .................. 392/469 |
| 4,347,401 A | * | 8/1982 | Knudsen et al. | ........... 174/14 R |
| 4,639,544 A | * | 1/1987 | Dableh et al. | ................. 174/32 |
| 4,851,056 A | * | 7/1989 | Miyoshi et al. | ............. 148/111 |
| 5,389,736 A | * | 2/1995 | Ziemek et al. | ................. 174/36 |

FOREIGN PATENT DOCUMENTS

| | | | | |
|---|---|---|---|---|
| EP | 0 434 641 A2 | * 12/1990 | ............ C21D/8/12 |
| EP | 0 606 884 | 7/1994 | |
| GB | 0 885 165 | * 12/1961 | ............ H02G/9/00 |
| JP | 10-1177083 | 5/1998 | |

OTHER PUBLICATIONS

Horton et al.; "Shielding the Power Frequency Magnetic Fields Produced by Underground Distribution Cables"; *Abstract* of Proceedings of the Twenty–Sixth Annaul North Amenican Power Symposium, (pp. 26–27), from Database Accession No. 4974088, XP002150585 (1994).

Verite et al.; "Magnetic field Calculation in Underground Cable Systems with Ferromagnetic Components"; *Abstract* of ELECTRA, cigre, France, No. 174 (pp. 78–79), from Database Accession No. 5858610, XP002150586 (1997).

Argaut et al.; "Shielding Technique to Reduce Magnetic Fields From Buried Cables"; Jicable, A10.5, pp. 331–338, (1999).

\* cited by examiner

*Primary Examiner*—William H. Mayo, III
(74) *Attorney, Agent, or Firm*—Finnegan, Henderson, Farabow, Garrett, & Dunner, L.L.P.

(57) ABSTRACT

A method for screening the magnetic field generated by an electrical power transmission line having at least one electrical cable. The cables may be inserted into a conduit having at least one layer of non-grain-oriented ferromagnetic material, having a magnetic curve with a maximum value of relative magnetic permeability ($\mu_{max}$).

34 Claims, 8 Drawing Sheets

METHOD OF SCREENING THE MAGNETIC FIELD GENERATED BY AN ELECTRICAL POWER TRANSMISSION LINE, AND ELECTRICAL POWER TRANSMISSION LINE

CROSS REFERENCE TO RELATED APPLICATIONS

This application is a national phase application based on PCT/EP01/05784, filed May 21, 2001, the content of which is incorporated herein by reference, and claims the priority of European Patent Application No. 00111645.8, filed May 31, 2000, the content of which is incorporated herein by reference, and claims the benefit of U.S. Provisional Application No. 60/209,483, filed Jun. 6, 2000, the content of which is incorporated herein by reference.

BACKGROUND OF THE INVENTION

1. Field of the Invention

The present invention relates to a method for screening the magnetic field generated by an electrical power transmission line. The present invention also relates to a magnetically screened electrical power transmission line.

2. Description of the Related Art

Generally, a high-power electrical power transmission line is designed to withstand voltages of the order of hundreds of kV (typically 400 kV) and currents of the order of thousands of amperes (typically 500–2000 A). The electrical power carried in these lines can reach values of the order of thousands of MVA, typically 1000 MVA. Normally, the current carried is an alternating current at low frequency, in other words generally below 400 Hz, and typically at 50–60 Hz. In general, these lines are used for transferring power from an electrical power station to a city, over distances of the order of tens of km (normally 10–100 km).

In a typical configuration, a three-phase line comprises three cables buried in a trench with a depth of 1–1.5 m. In the space immediately surrounding the cables, the magnetic field H can reach values of the order of $10^3$ A/m. At ground level, the measurable magnetic induction can reach values of the order of 20–60 $\mu$T, depending on the arrangement of the cables with respect to each other.

Although no biological effects due to exposure to magnetic fields of this size generated by low-frequency (50 Hz) sources have yet been demonstrated, there is currently a debate in the scientific community about a possible "safety threshold", to be adopted by law, below which the probability of biological damage can be reduced to a minimum, if not eliminated. A threshold of magnetic induction on which the scientific community appears to have reached agreement, and on which some national legislation is tending to become harmonized, is 0.2 $\mu$T. Thus the value in question is approximately 100 times smaller than that stated previously. The reduction of magnetic induction levels to less than 0.2 $\mu$T is certainly to be considered preferable.

The applicant has tackled the problem of screening the magnetic field generated by a high-power electrical power transmission line comprising cables buried in a trench, with the aim of achieving magnetic induction values at ground level of approximately 0.2 $\mu$T or less.

The article by P. Argaut, J. Y. Daurelle, F. Protat, K. Savina and C. A. Wallaert, "Shielding technique to reduce magnetic fields from buried cables", A 10.5, JICABLE 1999, describes some solutions for screening magnetic fields generated by three buried cables. In particular, it states the results of some simulations carried out with open-section screens (for example a sheet of ferromagnetic material placed above the cables) and closed-section screens (for example a conduit of rectangular section made of ferromagnetic material, placed around the three cables). The dependency of the screening efficiency on various factors, such as the relative magnetic permeability of the screening material, the thickness of material to be used and the relative positions of the cables and the magnetic screen, is analysed. According to the authors, the optimal material should have a relative magnetic permeability in the range from 700 to 1000 and a thickness in the range from 3 to 5 mm; in the case of a closed-section screen, the optimal relative position is one in which the cables are approximately ⅓ of the way down from the top of the screen. Also according to the authors, attenuation factors of approximately 5–7 can be obtained with open-section screens, factors of approximately 15–20 can be obtained with closed-section screens, factors of approximately 30–50 can be obtained when the closed-section screen is formed very close to the cables (for example from a sheet of ferromagnetic material wound directly around the three cables).

Patent application (Kokai) JP 10-117083 in the name of Nippon Steel Co. provides a solution for the screening of the magnetic field generated by an electrical power transmission cable, consisting of a tube of ferromagnetic material, made by winding a strip of magnetic material in a spiral, preferably on a tubular support, for example a metal or resin pipe. In the example described, the strip is made from grain-oriented steel and has a magnetic permeability which is higher in a direction parallel to the direction of winding than in the direction perpendicular thereto.

The patent EP 606884, also in the name of Nippon Steel, describes a process for producing grain-oriented silicon steel, in which the steel is subjected to a complex rolling process and subsequent stages of annealing, with predetermined times and temperatures, in the presence of recrystallization inhibitors.

The applicant has observed that the solutions described in the article by Argaut et al. cited above do not permit the achievement of very high screening factors, such as those necessary to screen the magnetic field generated by an electrical transmission line.

The applicant has also observed that the solution described in the patent application JP 10-117083 cited above provides for the use of a grain-oriented steel. In this type of steel, the grains have a direction of orientation parallel to the direction of winding: this makes it possible to obtain a very high magnetic flux density. It is produced by complex production processes, which make it possible to orientate the grains only in thin sheets, having thicknesses of the order of a tenth of a millimetre (see, for example, the patent EP 606884 cited above). Because the thickness is so small, the screening tube can be produced only by winding a steel strip in a spiral around a support, as described in patent application JP 10-117083, in order to ensure sufficient mechanical compressive strength. All this makes the process of producing a screening tube extremely complicated.

On the other hand, the applicant has found that it is possible to screen, with an attenuation factor of the order of 100 or above, the magnetic field generated by an electrical power transmission line, by inserting the cables in a conduit comprising at least one layer of non-grain-oriented ferromagnetic material having a high relative magnetic permeability in a range of magnetic field values below 1000 A/m. The screening conduit can advantageously be produced by normal extrusion or rolling methods, without making use of complex production processes for orientating the grains, or by winding as in the aforesaid patent application JP 10-117083.

Here and in the remainder of the description, the term "non-grain-oriented material" denotes a material in which the crystal domains (grains) essentially have no preferred direction of alignment. The degree of alignment can be evaluated by known methods, for example by optical microscopic analysis, or by X-ray diffractometric analysis. In other words, the material has not been subject to special processes of rolling and annealing, according to the methods used in the production of grain-oriented steel, and the only orientation which may be present in the material is that caused by a normal extrusion or rolling process.

SUMMARY OF THE INVENTION

In a first aspect, the invention relates to a method for screening the magnetic field generated by an electrical power transmission line comprising at least one electrical cable, the said method comprising the steps of:
inserting the said cable in a conduit comprising at least one layer of a ferromagnetic material,
characterized in that
the said ferromagnetic material is non-grain-oriented and has a magnetic curve with a maximum value of relative magnetic permeability ($\mu_{max}$) corresponding to a magnetic field value ($H_{\mu max}$) lower than 1000 A/m.

Preferably, the magnetic curve of the material has a maximum value of relative magnetic permeability ($\mu_{max}$) corresponding to a magnetic field value ($H_{\mu max}$) in the range from 10 A/m to 800 A/m.

Even more preferably, the magnetic curve has a maximum value of relative magnetic permeability ($\mu_{max}$) corresponding to a magnetic field value ($H_{\mu max}$) in the range from 30 A/m to 650 A/m.

Advantageously, the maximum value of relative magnetic permeability ($\mu_{max}$) is at least 500, being preferably in the range from 700 to 5000.

Typically, the method according to the invention comprises the step of burying the conduit in a trench of predetermined depth.

The screening layer can be produced by extrusion, or by the bending of a sheet of predetermined dimensions, for example one produced by rolling, and the subsequent welding of the sheet along its longitudinally opposing sides.

In a preferred embodiment, the method according to the invention additionally comprises the step of arranging the cable or cables in the conduit in such a way that the centre of gravity of a cross section of the cable is in the proximity of the geometrical centre of a corresponding section of the conduit.

Advantageously, the method according to the invention can additionally comprise the step of winding at least one elongated element, for example a cord, around the said at least one cable.

In a second aspect, the invention relates to an electrical power transmission line, comprising:
a conduit comprising at least one layer of ferromagnetic material,
at least one electrical cable inside the said conduit,
characterized in that
the said ferromagnetic material is of the non-grain-oriented type and has a magnetic curve having a maximum value of relative magnetic permeability ($\mu_{max}$) corresponding to a magnetic field value ($H_{\mu max}$) lower than 1000 A/m.

Preferably, the magnetic curve of the material has a maximum value of relative magnetic permeability ($\mu_{max}$) corresponding to a magnetic field value ($H_{\mu max}$) in the range from 10 A/m to 800 A/m.

Even more preferably, the magnetic curve has a maximum value of relative magnetic permeability ($\mu_{max}$) corresponding to a magnetic field value ($H_{\mu max}$) in the range from 30 A/m to 650 A/m.

Advantageously, the maximum value of relative magnetic permeability ($\mu_{max}$) is at least 500, being preferably in the range from 700 to 5000.

In a first example, the ferromagnetic material is a steel whose total content of impurities does not exceed 1.5%.

Preferably, the total content of impurities does not exceed 1%, and even more preferably it does not exceed 0.5%. The said steel with a low content of impurities can be a low-carbon steel: preferably, the carbon content does not exceed 0.16%, and even more preferably it does not exceed 0.03%.

The said steel with a low content of impurities can be a low-manganese steel: preferably, the manganese content does not exceed 1%, and even more preferably it does not exceed 0.5%.

Advantageously, the resistivity of the steel with a low content of impurities is less than 20 $\mu\Omega\cdot$cm. To improve the screening effect, the grain size index G of the said steel, measured according to the ASTM E-112 standard, is less than 9.

In a second example, the ferromagnetic material is a silicon steel. Preferably, the silicon content is in the range from 1% to 4%.

Advantageously, the electrical power transmission line according to the invention can comprise a support for the cable or cables inside the conduit.

In a preferred embodiment, the electrical power transmission line comprises at least one elongated element wound in a spiral around the said at least one cable, for example a cord made from dielectric material. Preferably, the dielectric material is selected from a group comprising nylon fibres, aramid fibres and polyester fibres.

BRIEF DESCRIPTION OF THE DRAWINGS

Further characteristics and advantages will be more clearly evident in the light of the detailed description of some examples of the present invention. This description, provided below, relates to the attached drawings provided solely by way of example and without restrictive intent, in which.

DETAILED DESCRIPTION OF THE INVENTION

Figure 1:
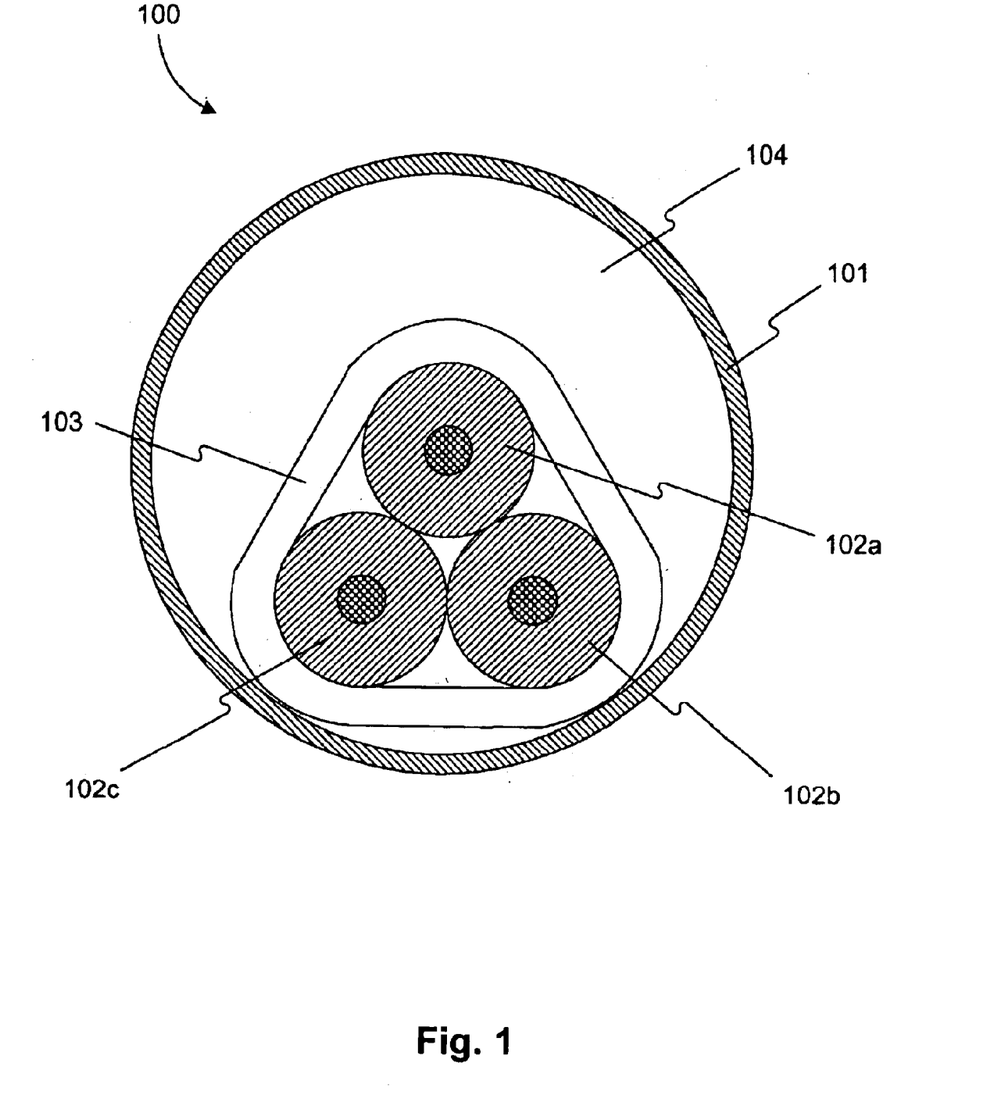
FIG. 1 shows schematically in cross section an example of a transmission line according to the present invention.

With reference to FIG. 1, a line 100, suitable for electrical power transmission at high power, comprises a conduit 101 made from ferromagnetic material, preferably having a closed cross section, and at least one electrical cable. The section of the conduit is generally essentially circular: sections of different shape, such as a square section, are not excluded. Typically, three cables 102a, 102b, 102c are placed inside the conduit 101, each carrying an alternating current (typically 50–60 Hz), in a three-phase line. Preferably, the cables 102a, 102b, 102c are arranged in a trefoil configuration, in other words in such a way that their geometrical centres are approximately positioned on the vertices of a triangle (seen in section). Advantageously, the cables are in contact with each other.

For example, the cables 102a, 102b, 102c can be made from enamelled copper Milliken conductors, with a cross section of 2500 mm$^2$, insulated with an extruded polymer, for example cross-linked polyethylene (XLPE). A metal sheath can also be placed on the outer surface of the cable, to protect it from moisture. The total external diameter of each cable is typically in the range from 100 to 150 mm.

Preferably, the cables 102a, 102b, 102c are raised above the bottom of the conduit 101 and supported by a support means 103 located inside the conduit 101, in such a way as to reduce the distance between the centre of gravity of a cross section of the trefoil of cables and the geometrical centre of a corresponding cross section of the conduit 101. In a preferred embodiment, the support means 103 is an elongate element wound in a spiral around the trefoil of cables.

Alternatively, the cables 102a, 102b, 102c can be supported by direct contact with the bottom of the conduit 101.

The space 104 inside the conduit 101 which is not occupied by the trefoil of cables 102a, 102b, 102c and the support 103 can be left in its air-filled state, or a, fluid, for example an inert gas, can be introduced into it. Preferably, a small overpressure is provided inside the conduit to impede the ingress of moisture from the exterior of the conduit 101. For example, it is possible to introduce dry nitrogen into the inner space 104 and subject the conduit to a small internal overpressure of approximately 0.5 bar. Thus the metal moisture-proofing sheath usually placed on the outer surface of each cable can be dispensed with.

The line 100 is typically buried in a trench, generally having a depth of not more than 0.5 m (typically 1–1.5 m). The outer wall of the conduit 101 is covered with protective material capable of preventing corrosion, for example polyethylene or bitumen.

The thickness of the conduit 101 can be chosen from a range of 2 to 14 mm, and preferably 4 to 10 mm; even more preferably, it is approximately 8 mm. In general, the thickness of the conduit 101 is chosen in such a way as to enable the conduit to withstand stresses of the mechanical type (such as accidental impact of excavating equipment, for example) and also to withstand the weight of the overlying soil.

The internal diameter of the conduit 101 can be chosen from a range of 2.3 to 2.8 times the diameter of the cable carrying each individual phase, in such a way that the cables can be pulled through with sufficient ease during the laying of the line.

The applicant has found that a conduit comprising at least one layer of non-grain-oriented ferromagnetic material, characterized by a magnetic curve having a maximum value of magnetic permeability $\mu_{max}$ corresponding to a magnetic field value $H_{\mu max}$ of less than 1000 A/m, provides a highly effective screen against the magnetic field generated by an electrical power transmission line having a power of 1000 MVA (with a voltage of 400 kV and a current of 1500 A), as described above with reference to FIG. 1.

Figure 2:
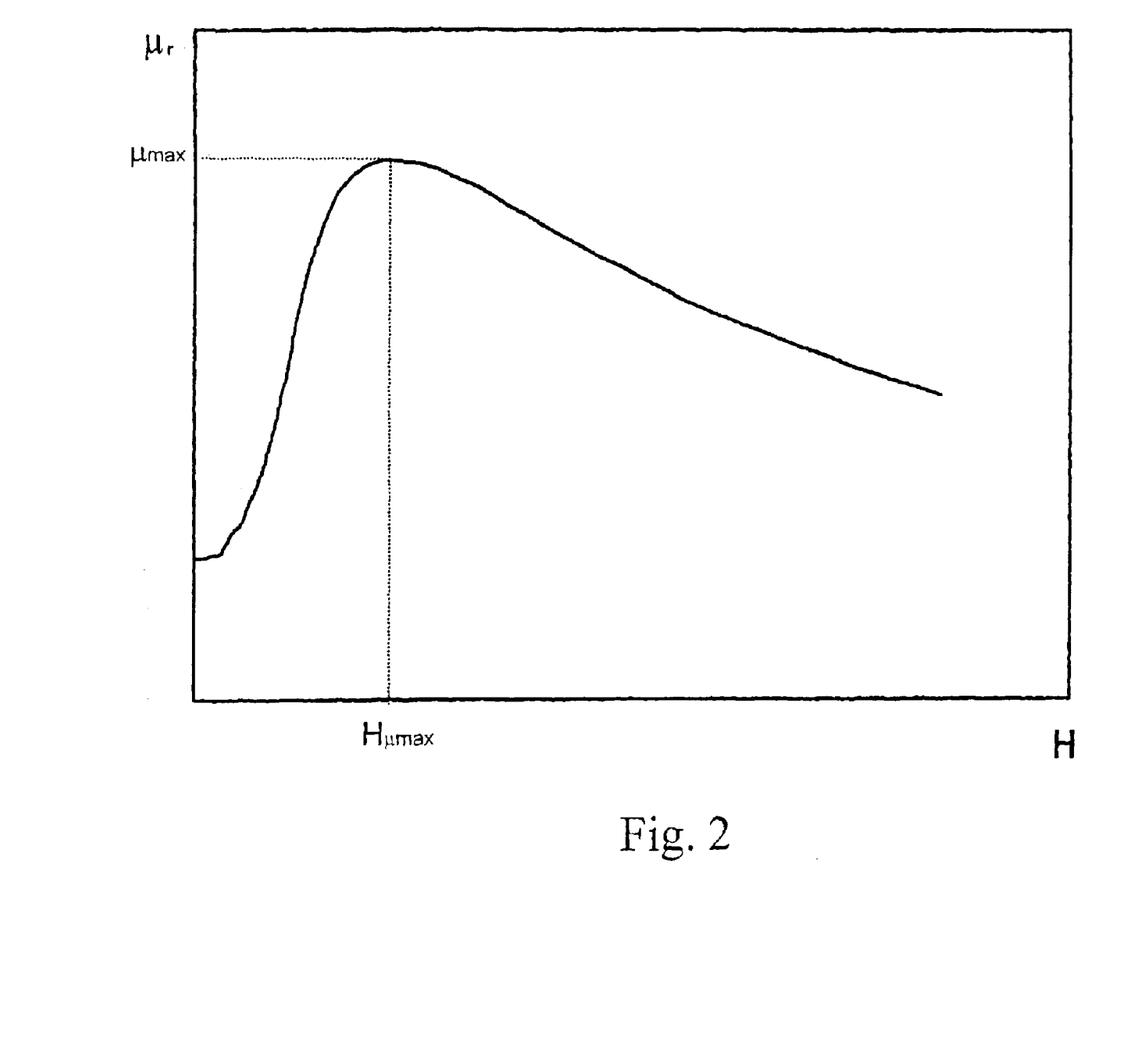
FIG. 2 shows schematically a typical magnetic curve $\mu_r$-H of a ferromagnetic material, showing the co-ordinates of the peak of the curve ($\mu_{max}$, $H_{\mu max}$)

Here and in the remainder of the description, the term "magnetic curve" denotes a curve describing the variation of the relative magnetic permeability $\mu_r$ of a material as a function of an applied magnetic field H, as found by measurements according to the IEC 404 "Magnetic materials" standard. In particular, according to this standard, the magnetic permeability is measured by immersing a ring of material in a magnetic field directed circumferentially with respect to it. A typical magnetic curve of a ferromagnetic material is shown schematically in FIG. 2, where the co-ordinates of the peak $\mu_{max}$, $H_{\mu max}$ are indicated.

Without wishing to associate himself with any particular theory of interpretation, the applicant considers that the screening capacity of the conduit depends on the value which the magnetic field takes inside the screening material.

The value of the magnetic field inside the material will be denoted by $H_{mat}$ and the value of the magnetic field generated by the cables alone by $H_c$. Since the material is ferromagnetic, the magnetic field $H_{mat}$ inside it is smaller than $H_c$. According to the applicant, effective screening can be obtained by making a conduit from a material having a peak of magnetic permeability $\mu_{max}$ centred on a magnetic field value $H_{\mu max}$ close to the value which the magnetic field has inside the material ($H_{mat}$), in other words a value lower than $H_c$. In the region of the peak, the magnetic permeability of the screening material becomes very high. If the magnetic field $H_{mat}$ has a value close to $H_{\mu max}$ inside the material, the material has a high magnetic permeability, and therefore a high capacity for "trapping" the magnetic field inside itself. This is equivalent to a high capacity for screening the magnetic field produced by the cables.

The phenomenon described above is of a highly non-linear kind, owing to the dependence of the magnetic permeability $\mu_r$ on the applied magnetic field: in general, it is impossible to predict the value which the magnetic field $H_{mat}$ will have inside a ferromagnetic material immersed in an external magnetic field $H_c$. According to the type of material and the magnetic field generated by the cables, the material of the conduit has a certain magnetic field value $H_{mat}$ and therefore a certain value of magnetic permeability $\mu_r$: as $\mu_r$ increases, the conduit's capacity to trap the magnetic field also improves.

The applicant has noted that the screening effect becomes more effective as $H_{\mu max}$ decreases. Preferably, $H_{\mu max}$ is in the range from 10 A/m to 800 A/m. Even more preferably, $H_{\mu max}$ is in the range from 30 A/m to 650 A/m. Advantageously, the maximum value $\mu_{max}$ of magnetic permeability is greater than 500, and preferably in the range from 700 to 5000.

By introducing the cables 102a, 102b, 102c of the transmission line 100 into a conduit 101 comprising at least one screening layer of a material with the aforesaid characteristics, it is possible to obtain values of magnetic induction of the order of, or less than, 0.2 $\mu$T at a distance of 0.5 m from the top of the conduit.

If the maximum value of the magnetic curve of the material of the screening layer corresponds to lower magnetic field values (around magnetic field values of 200–250 A/m or below), the screening capacity increases progressively in an exponential way, until the values of magnetic induction found at ground level are practically unmeasurable by ordinary instruments.

The screening efficiency can decrease, however, if the screening material has a peak of magnetic permeability corresponding to magnetic field values below approximately 10 A/m. This is because, in materials having values of $H_{\mu max}$ as low as this, the peak of magnetic permeability can be very narrow: in other words, outside a limited range of magnetic field values, the magnetic permeability of the material can decrease very rapidly to values which may prove to be insufficient to screen the intense magnetic field generated by the transmission line.

A first example of a material with the magnetic characteristics mentioned above is a steel having a total content of impurities not exceeding approximately 1.5%, preferably not exceeding approximately 1%, and even more preferably not exceeding approximately 0.5%.

Here and in the remainder of the description, the term "impurities" denotes all elements other than iron which are present in the steel.

More particularly, the steel of the screening layer is preferably a low-carbon steel. Here and in the remainder of the description, the term "low-carbon" relates to a carbon content not exceeding 0.5% by weight.

Preferably, the carbon content does not exceed approximately 0.16%, and even more preferably it does not exceed approximately 0.03%.

Additionally, the steel of the screening layer preferably has a manganese content not exceeding approximately 1%, and even more preferably not exceeding approximately 0.5%.

Without wishing to associate himself with any particular theory of interpretation, the applicant considers that the impurities present, and particularly the manganese and the carbon, reduce the magnetic screening since they are interposed, in the crystal lattice of the steel, between the grains of iron, removing continuity from the magnetic structure of the material: thus micro-regions of low magnetic permeability are created inside the material, making the screening of the magnetic field less effective.

The applicant has noted that, as the grain size of the steel increases, there is a corresponding improvement in the screening capacity of the layer. According to international standards, the grain size of a steel can be determined by means of a dimensionless index G, derived from a count of the number of grains present within a predetermined area. As the grain size increases, therefore, the index G decreases. In some examples of steels tested by the applicant, the grain size was evaluated by means of the dimensionless index G according to the ASTM E-112 standard. Preferably, the size of the grains, evaluated by means of the index G (ASTM E-112), does not exceed 9.

Preferably, the steel for an effective screening layer has an electrical resistivity of less than 20 $\mu\Omega$·cm. A low resistivity facilitates the flow of the currents induced by the magnetic field generated by the cables on the surface of the conduit, thus improving the magnetic screen effect of the conduit.

A second example of a screening material with the magnetic characteristics mentioned above is a non-grain-oriented silicon steel. To provide effective screening, the percentage of silicon in the steel can be selected from a range from 1% to 4%.

A screening layer with the aforementioned characteristics can advantageously be made by conventional methods. For example, the layer can be produced by extrusion, or by bending a sheet of predetermined dimensions and then welding it along its longitudinally opposing edges. This sheet can be produced, for example, by rolling.

Figure 7:
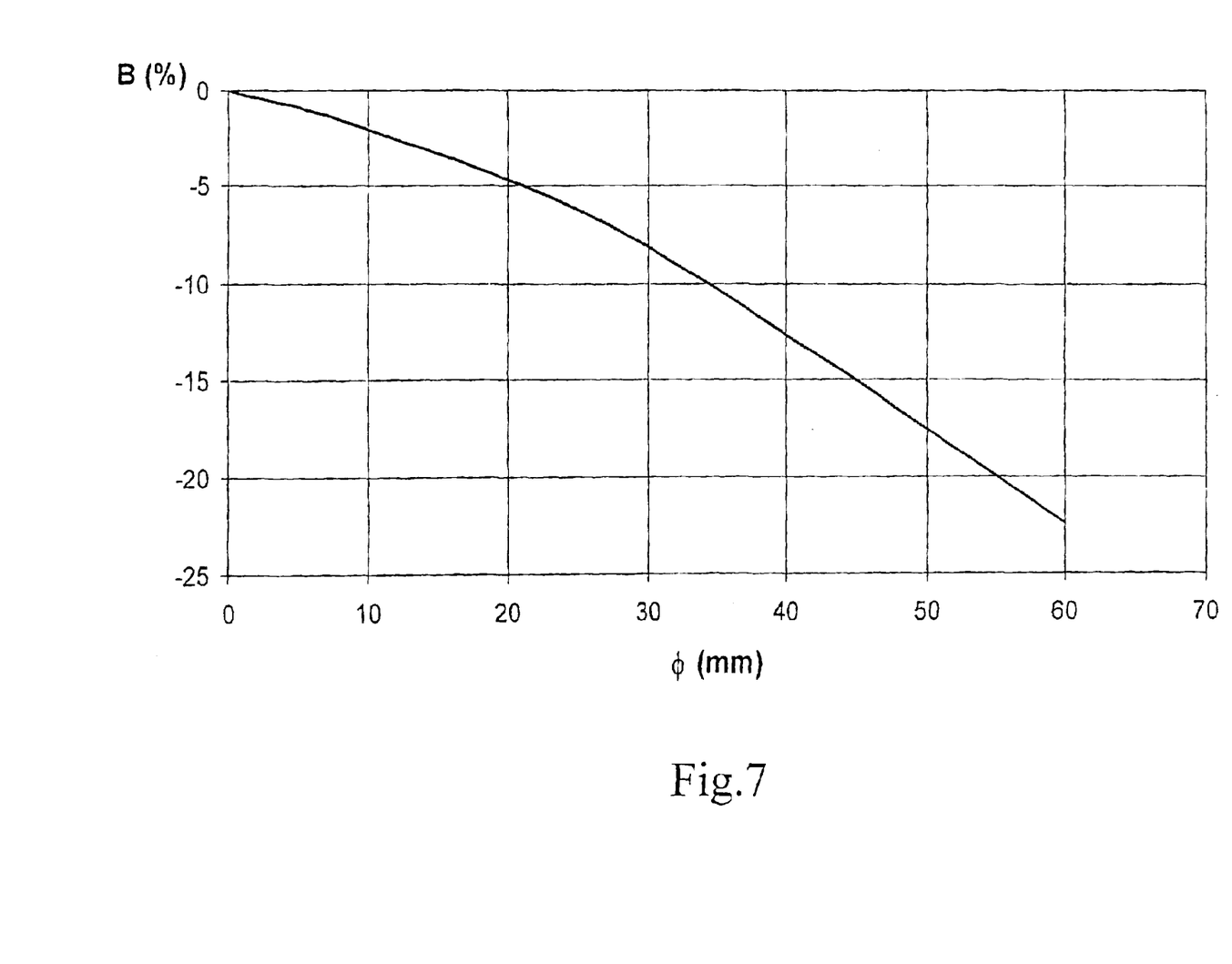
FIG. 7 shows a graph of the magnetic induction B found at ground level, as a function of the diameter of a cord wound around the cables.

In the particularly preferred embodiment shown in FIG. 1, the three cables 102a, 102b, 102c are arranged in trefoil configuration and raised from the bottom of the conduit 101 by at least one elongated element 103, for example a cord wound in a spiral around the three cables. FIG. 7 shows the result of a simulation, carried out by the applicant, of a calculation of the magnetic induction at ground level, at a distance of 1.2 m from the top of a conduit made from low-carbon steel, as a function of the diameter of the cord.

The following parameters were taken into account for the simulation: external diameter of the conduit 400 mm, thickness of the conduit 10 mm, diameter of each cable 150 mm, current 1500 A, voltage 400 kV.

FIG. 7 shows the decrease of the magnetic induction at ground level with the increase of the diameter ($\phi$) of the cord: it can be seen that the magnetic induction reaches a minimum value when the diameter of the cord is 60 mm, which corresponds to bringing the centre of gravity of the cables 102a, 102b, 102c to the geometric centre of the conduit 101 (seen in section).

The simulation also revealed that, when the centre of gravity of the cables is moved towards the geometrical centre of the conduit, the lines of flux of the magnetic induction tend to be more closely packed inside the conduit 101 and to have a more symmetrical form. The improvement of the symmetry of the system permits an even more effective selection of a steel having a peak of relative magnetic permeability according to what has been mentioned previously, since the magnetic field generated by the cables is essentially uniform over the whole internal surface of the conduit, as is the magnetic behaviour of the material from which the conduit is made. In other words, when the centre of gravity of the cables 102a, 102b, 102c is brought towards the geometric centre of the conduit 101 the material of the conduit comes to have essentially the same relative magnetic permeability along the whole of the conduit.

The support 103 makes it possible to reduce the losses due to parasitic currents, which are localized in the regions of the conduit 101 close to the points of contact of the cables 102a, 102b, 102c, owing to the spacing of the two cables 102b, 102c from the bottom of the conduit: in the upper region of the conduit 101 there is a small increase in the losses, due to the corresponding approach of the cable 102a. Anyhow, the overall effect is a reduction of the losses.

Advantageously, the use of an element wound around the cables 102a, 102b, 102c enables the cables to be kept in close contact with each other at all times, even when they tend to become separated as a result of thermomechanical or electromechanical stresses. By keeping the cables in contact with each other, it is possible to reduce to a minimum the distance between the centres of the cables, in other words between the centres of the currents flowing in the cables, along the conduit 101, with a consequent decrease in the magnetic induction to be screened.

The diameter of the supporting cord 103 can be selected in such a way as to bring the centre of gravity of the cables closer to the geometrical centre of the conduit 101 (seen in section) at a distance which is preferably less than (D-d)/6, where D represents the internal diameter of the conduit 101 and d represents the external diameter of one of the cables 102a, 102b, 102c. Thus it is possible to obtain a good compromise between the reduction of the magnetic induction (FIG. 7) and the limitation imposed by the overall dimensions of the system of cord and cables inside the conduit 101.

For installing the line 100, the first step is normally to lay the conduit 101, by excavating a trench and then burying individual lengths of conduit in succession. The individual lengths are then joined by welding or another method which ensures electrical continuity and impedes the ingress of moisture. The trench can then be reclosed, allowing a rapid restoration of the area affected by the laying. The cables are then threaded into one end of the conduit and pulled from the other end. In the embodiment illustrated in FIG. 1, the cables 102a, 102b, 102c are brought together in a trefoil configuration, and then the cord 103 is wound in a spiral around them, to prevent their movement with respect to each other; they are then threaded into the conduit 101. When they have been threaded into the conduit, the cables 102a, 102b, 102c rest on the cord 103, being positioned with their centre of gravity in the proximity of the geometrical centre of the conduit 101. During the cable laying stage, the cord 103 is subject to considerable traction as a result of the weight of the cables 102a, 102b, 102c, and the friction with the bottom of the conduit 101: for this reason, the material from which the cord 103 is made must be able to withstand both the traction and the abrasion due to rubbing. Preferably, the cord is made from dielectric material. In one embodiment constructed by the applicant, the supporting cord consists of nylon fibres; other materials which can be used are polyester fibres or aramid fibres such as Kevlar®.

EXAMPLE 1

Figure 3:
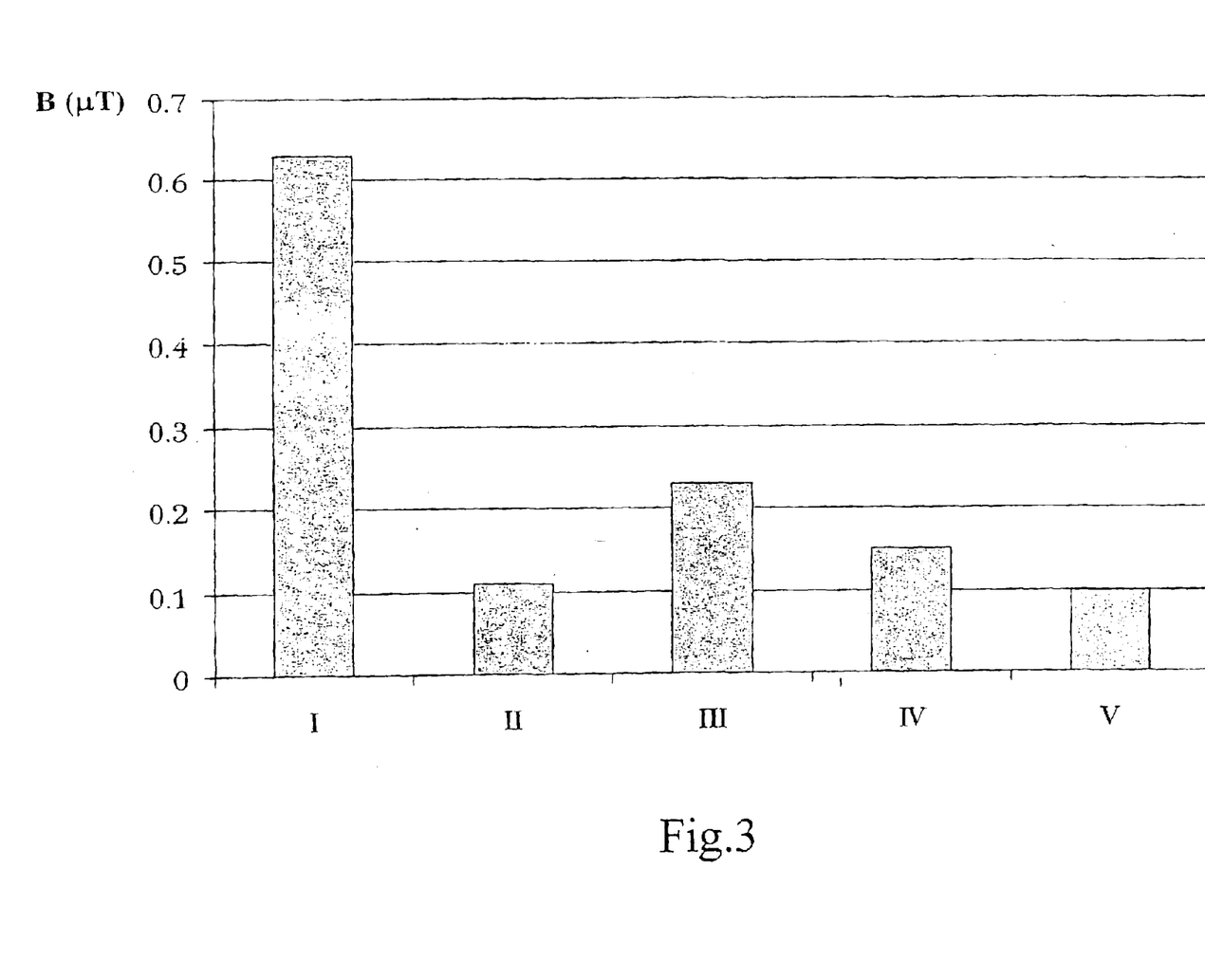
FIG. 3 shows a graph of the magnetic induction B found at ground level when conduits made from different types of steel are used.
Figure 4:
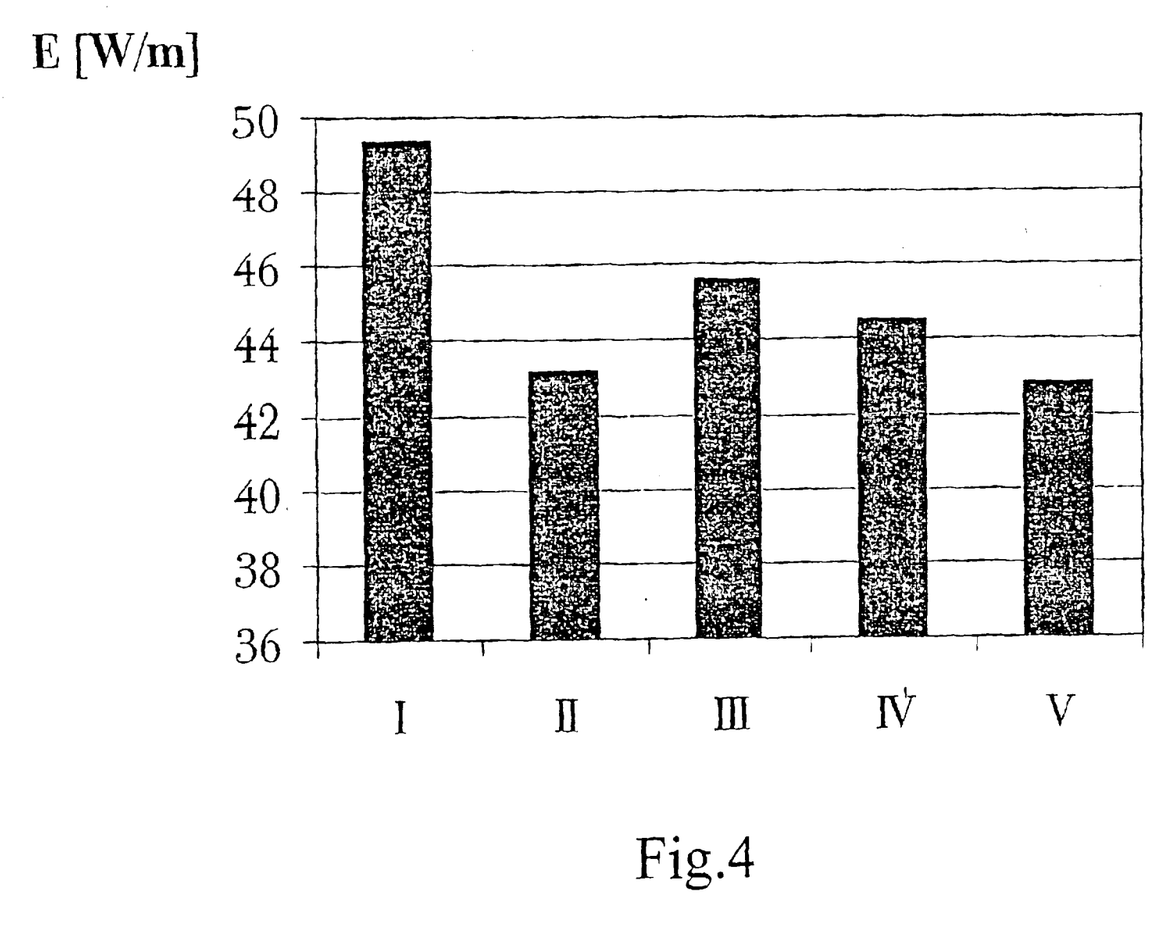
FIG. 4 shows a graph of the electrical losses in the conduit, for different types of steel.

FIGS. 3 and 4 show the results of a simulation carried out by the applicant by a finite elements calculation: this evaluated the magnetic induction B at ground level generated by a 400 kV 1500 A transmission line comprising three cables with a cross section of 2500 mm², arranged in trefoil inside a ferromagnetic steel conduit with a closed section, having an external diameter of 406 mm and a thickness of 10 mm, buried in a trench with a depth of 1500 mm. The simulation was carried out with different types of non-grain-oriented steel. The electrical losses in the conduit were also evaluated: these comprise both losses due to the currents induced in the conduit by the current flowing in the cables, and losses associated with the magnetic hysteresis of the material from which the conduit is made.

Table 1 shows the chemical composition (the percentages relate to the total weight of the steel), the electrical resistivity and the index G (ASTM E-112) characterizing the grain size of the steels in question. The co-ordinates of the peak of the magnetic curve of the steels are also shown.

TABLE 1

| Type of steel | | I Cfr. | II Inv. | III Inv. | IV Inv. | V Inv. |
|---|---|---|---|---|---|---|
| Element | | | | | | |
| Carbon | % | 0.180 | 0.130 | 0.160 | 0.009 | 0.010 |
| Manganese | % | 1.460 | 0.490 | 0.680 | 0.200 | 0.190 |
| Silicon | % | 0.270 | 0.200 | 0.030 | 0.030 | 0.030 |
| Sulphur | % | 0.018 | 0.010 | 0.011 | 0.005 | 0.011 |
| Phosphorus | % | 0.015 | 0.011 | 0.007 | 0.005 | 0.005 |
| Chromium | % | 0.050 | 0.050 | 0.013 | 0.013 | 0.013 |
| Nickel | % | 0.030 | 0.020 | 0.023 | 0.021 | 0.025 |
| Molybdenum | % | 0.020 | 0.010 | 0.005 | 0.005 | 0.005 |
| Aluminium | % | 0.027 | 0.011 | 0.055 | 0.023 | 0.027 |
| Copper | % | 0.020 | 0.100 | 0.025 | 0.007 | 0.016 |
| Total impurities | % | 2.090 | 1.032 | 1.009 | 0.318 | 0.332 |
| Iron | % | 97.910 | 98.968 | 98.991 | 99.682 | 99.668 |
| Electrical resistivity | $\Omega \cdot m$ | 2.16E−07 | 1.74E−07 | 1.66E−07 | 1.19E−07 | 1.17E−07 |
| G (ASTM E-112) | | 9.5 | 7.5 | 9.5 | 7.0–7.5 | 6.0–6.5 |
| $\mu_{max}$ | | 482 | 718 | 737 | 956 | 1114 |
| $H_{\mu max}$ | A/m | 1350 | 616 | 970 | 540 | 523 |

To evaluate the losses due to hysteresis, the angle of hysteresis was also measured and found to be approximately 30° for all the steels shown in Table 1.

Figure 8:
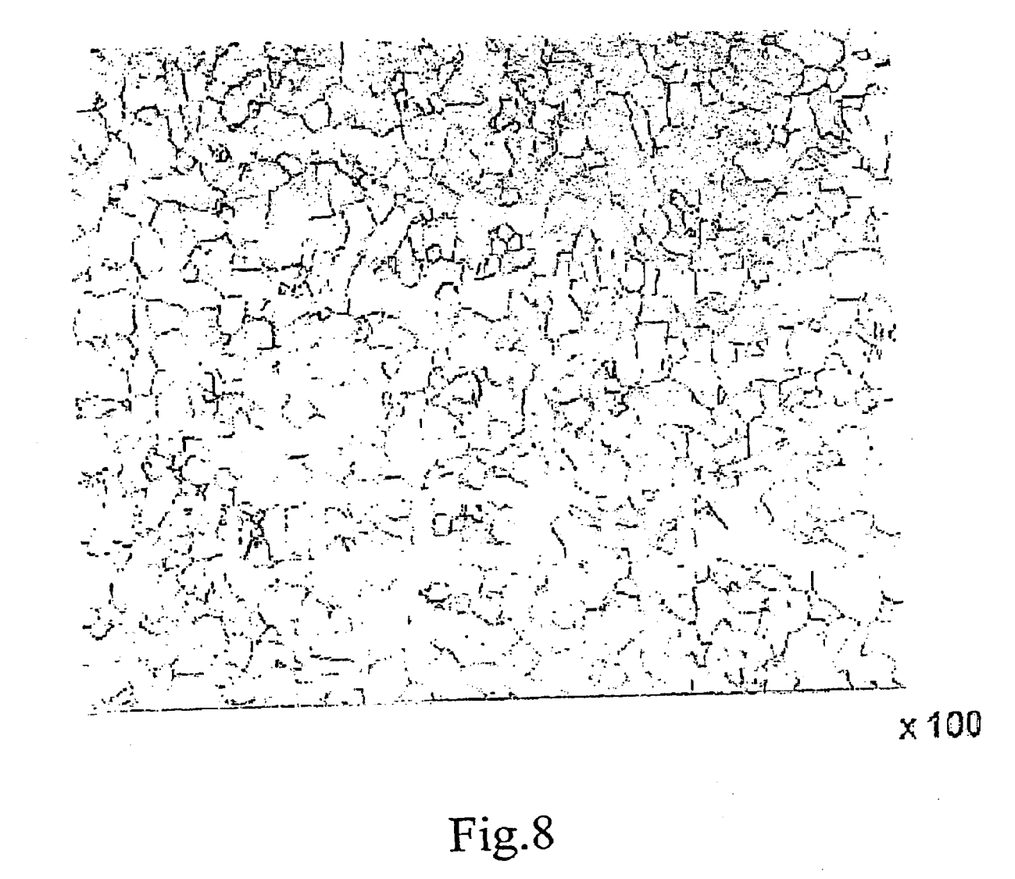
FIG. 8 shows a microscopic view of the crystal domains of a non-grain-oriented steel.

FIG. 8 shows a photograph, taken through an optical microscope, of a portion of type V steel, showing its grains. As can be seen, the grains do not have a preferred direction of alignment.

FIG. 3 shows the magnetic induction B at ground level, in $\mu T$, calculated by the simulation for the five types of steel in Table 1.

As can be seen, the conduit made from steel I is clearly the worst of the five considered, with values of magnetic induction B from three to seven times higher than those found with steels II to V. This result indicates that this steel is not suitable for screening the magnetic fields generated by a high-power transmission line, if values of magnetic induction at ground level of 0.2 $\mu T$ or less are to be obtained.

Returning to FIG. 3, it can be seen that, on the other hand, steels II to V are very effective in terms of the screening of the magnetic field, provide values of magnetic induction as low as approximately 0.1–0.2 $\mu T$. It should be noted that values of magnetic induction 100 to 200 times lower are obtained than with a configuration consisting of three buried cables with no magnetic screen.

FIG. 4 shows the electrical losses (E) in the conduit, measured in W/m, for the five types of steel considered. As can be seen, steels II to V are also significantly better than the type I steel in respect of this parameter, which is fundamental to the design of the transmission line, since it is responsible for any overheating of the system. An increase in the temperature of the tube due to the flow of parasitic currents, in fact, leads to a heating of the cables, with a consequent decrease of the current-carrying capacity of the cables.

Figure 5:
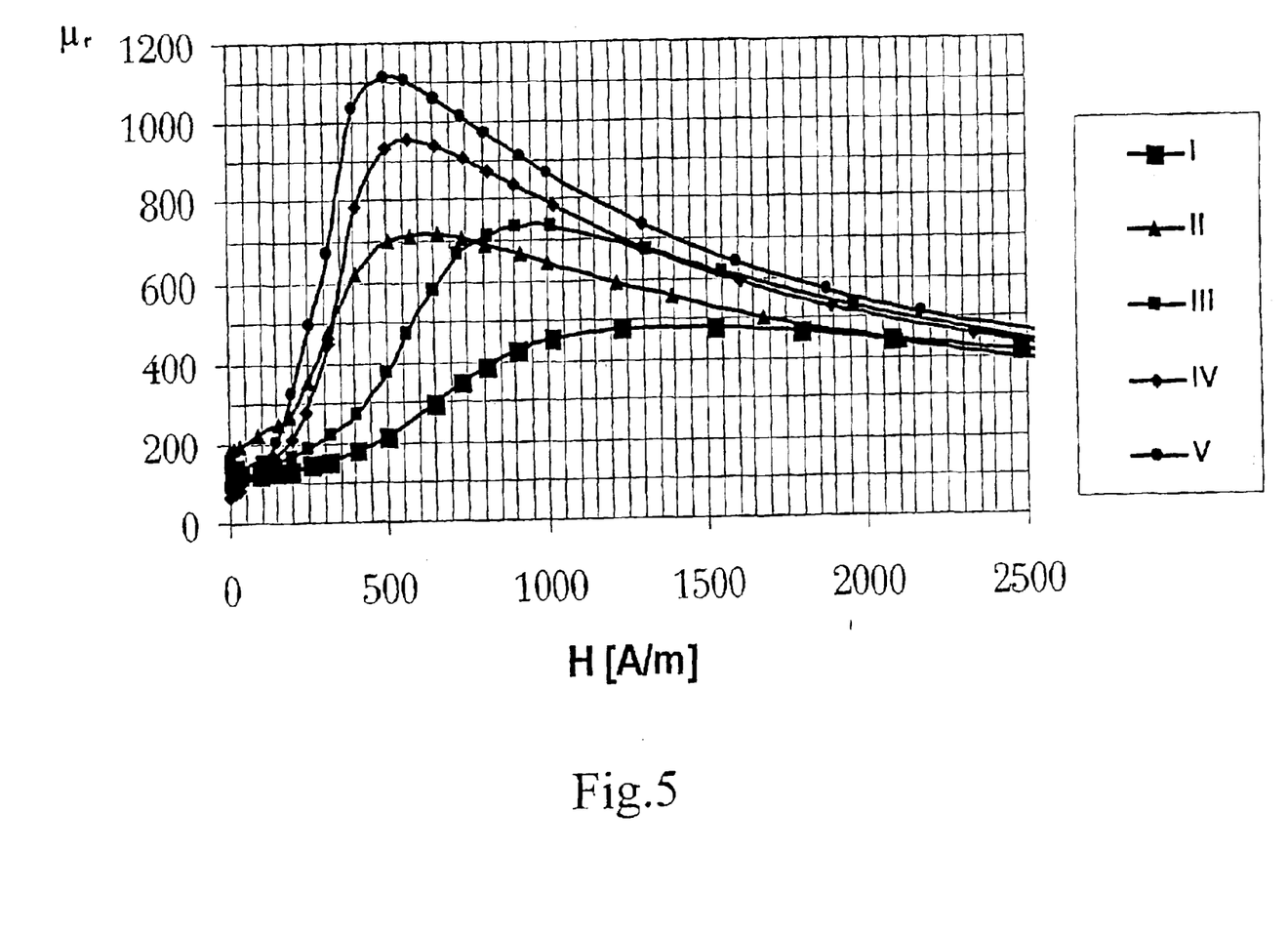
FIG. 5 shows the magnetic curves $\mu_r$-H of different types of steel.

FIG. 5 shows the magnetic curves measured for steels I-II-III-IV-V, in other words the curves describing the variation of the relative magnetic permeability $\mu_r$ as a function of the applied magnetic field H. The measurement was made according to the IEC 404 "Magnetic materials" standard.

As can be seen, the abscissa $H_{\mu max}$ of the peak of the magnetic curve for type II-III-IV-V steels corresponds to lower values of the magnetic field than the abscissa $H_{\mu max}$ of the peak of the curve of the type I steel. The values ($\mu_{max}$, $H_{\mu max}$)) for steels I to V are shown in Table 1.

Additionally, the type II-III-IV-V steels have a peak of magnetic permeability $\mu_{max}$ which is higher than the peak of the curve of the type I steel.

EXAMPLE 2

Figure 6:
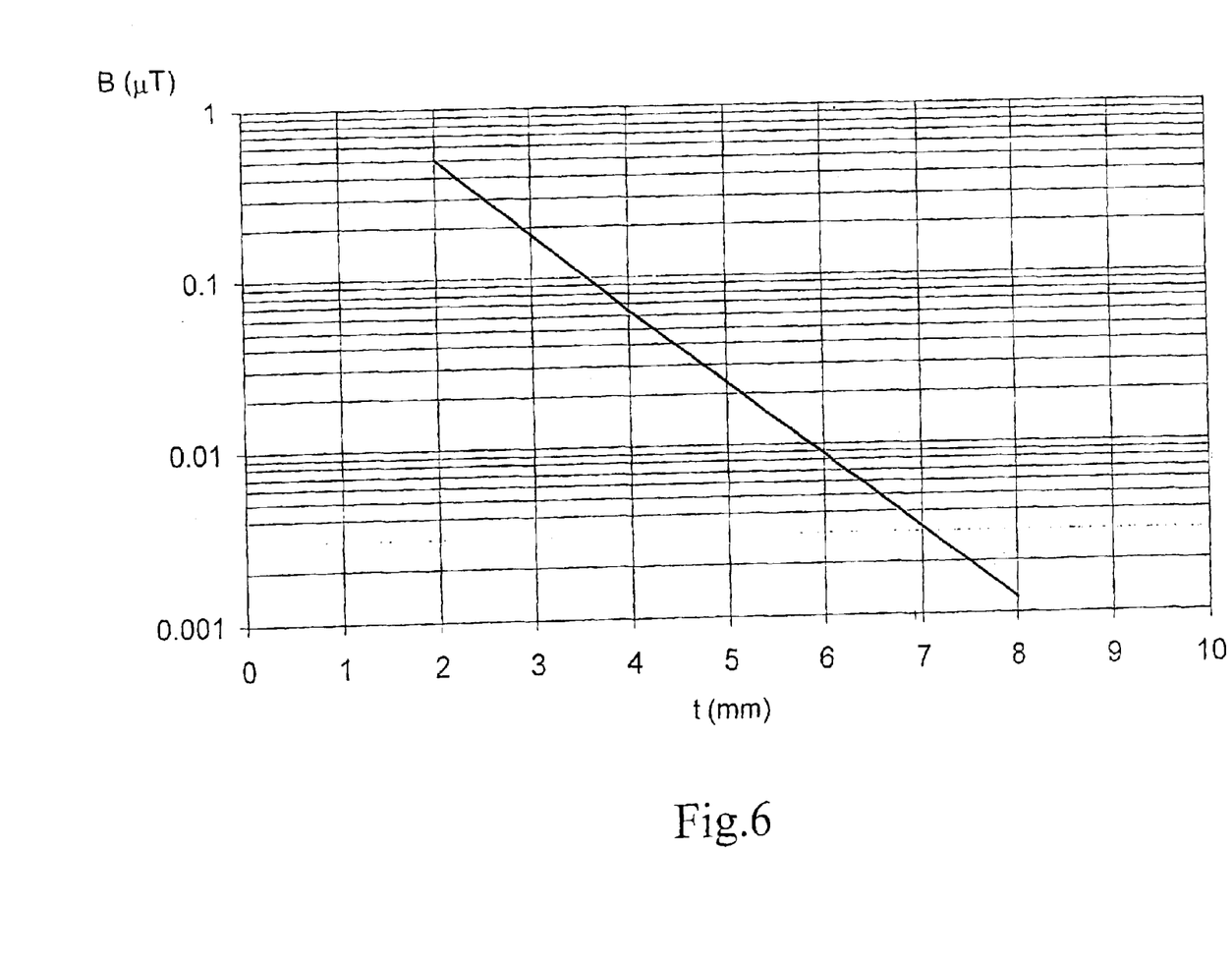
FIG. 6 shows a graph of the magnetic induction B found at ground level when a conduit made from non-grain-oriented silicon steel is used, as a function of the thickness of the conduit.

FIG. 6 shows the result of a simulation carried out by the applicant, in which the conduit was made from a non-grain-oriented low-carbon steel, containing approximately 2% silicon. FIG. 6 shows the variation of the magnetic induction at ground level as a function of the thickness (t) of the conduit. As it can be seen, a thickness of only 3 mm of silicon steel is sufficient to screen the magnetic field enough to obtain values of magnetic induction at ground level of less than 0.2 $\mu$T. With a thickness of 8 mm, it is possible to achieve values of magnetic induction of the order of $10^{-3}$ $\mu$T, at the limit of the range of the measuring instruments.

What is claimed is:

1. An electrical power transmission line comprising:
   a conduit comprising at least one layer of a ferromagnetic material; and
   at least one electrical cable inside said conduit, said ferromagnetic material being of the non-grain-oriented type and having a magnetic curve having a maximum value of relative magnetic permeability ($\mu_{max}$) corresponding to a magnetic field value ($H_{\mu max}$) lower than 1000 A/m.

2. The electrical power transmission line according to claim 1, wherein said magnetic curve has a maximum value of relative magnetic permeability ($\mu_{max}$) corresponding to a magnetic field value ($H_{\mu max}$) in the range from 10 A/m to 800 A/m.

3. The electrical power transmission line according to claim 2, wherein said magnetic curve has a maximum value of relative magnetic permeability ($\mu_{max}$) corresponding to a magnetic field value ($H_{\mu max}$) in the range from 30 A/m to 650 A/m.

4. The electrical power transmission line according to claim 1, wherein said maximum value of relative magnetic permeability ($\mu_{max}$) is at least 500.

5. The electrical power transmission line according to claim 1, wherein said ferromagnetic material is a steel whose total content of impurities does not exceed 1.5%.

6. The electrical power transmission line according to claim 5, wherein said steel has a total content of impurities not exceeding 1%.

7. The electrical power transmission line according to claim 6, wherein said steel has a total content of impurities not exceeding 0.5%.

8. The electrical power transmission line according to claim 5, wherein said steel is a low-carbon steel.

9. The electrical power transmission line according to claim 8, wherein said steel has a carbon content not exceeding 0.16%.

10. The electrical power transmission line according to claim 9, wherein said steel has a carbon content not exceeding 0.03%.

11. The electrical power transmission line according to claim 5, wherein said steel has a manganese content not exceeding 1%.

12. The electrical power transmission line according to claim 11, wherein said steel has a manganese content not exceeding 0.5%.

13. The electrical power transmission line according to claim 5, wherein the resistivity of said steel is less than 20 $\mu\Omega$·cm.

14. The electrical power transmission line according to claim 5, wherein the grain size index G (ASTM E-112) of said steel is less than 9.

15. The electrical power transmission line according to claim 1, wherein said ferromagnetic material is a silicon steel.

16. The electrical power transmission line according to claim 15, wherein said steel has a silicon content in the range from 1% to 4%.

17. The electrical power transmission line according to claim 1, further comprising a support for said at least one cable inside said conduit.

18. The electrical power transmission line according to claim 1, further comprising an elongated element wound in a spiral around said at least one electrical cable.

19. The electrical power transmission line according to claim 18, wherein said elongated element is a cord made from dielectric material.

20. The electrical power transmission line according to claim 19, wherein said dielectric material is selected from the group consisting of nylon fibres, aramid fibres and polyester fibres.

21. The electrical power transmission line according to claim 1, wherein the thickness of said conduit is in the range from 2 to 14 mm.

22. The electrical power transmission line according to claim 21, wherein the thickness of said conduit is in the range from 4 to 10 mm.

23. The electrical power transmission line according to claim 22, wherein the thickness of said conduit is 8 mm.

24. The electrical power transmission line according to claim 1, wherein said at least one electrical cable has an external diameter $D_c$, said conduit has an internal diameter $D_t$, and $D_t$ is in the range from 2.3 $D_c$ to 2.8 $D_c$.

25. A method for screening the magnetic field generated by an electrical power transmission line comprising at least one electrical cable, comprising the step of:
   inserting said at least one electrical cable in a conduit comprising at least one layer of a ferromagnetic material,
   said ferromagnetic material being non-grain-oriented and having a magnetic curve with a maximum value of relative magnetic permeability ($\mu_{max}$) corresponding to a magnetic field value ($H_{\mu max}$) lower than 1000 A/m.

26. The method according to claim 25, wherein said magnetic curve has a maximum value of relative magnetic permeability ($\mu_{max}$) corresponding to a magnetic field value ($H_{\mu max}$) in the range from 10 A/m to 800 A/m.

27. The method according to claim 25, wherein said magnetic curve has a maximum value of relative magnetic permeability ($\mu_{max}$) corresponding to a magnetic field value ($H_{\mu max}$) in the range from 30 A/m to 650 A/m.

28. The method according to claim 25, wherein said maximum value of relative magnetic permeability ($\mu_{max}$) is at least 500.

29. The method according to claim 25, further comprising the step of:

burying said conduit in a trench of predetermined depth.

30. The method according to claim 25, wherein said at least one layer is produced by extrusion.

31. The method according to claim 25, wherein said at least one layer is produced by the bending of a sheet of predetermined dimensions, and the subsequent welding of the sheet along its longitudinally opposing sides.

32. The method according to claim 31, wherein said sheet is produced by rolling.

33. The method according to claim 25, further comprising the step of:

arranging said at least one cable in said conduit in such a way that the center of gravity of a cross section of the said at least one cable is in the proximity of the geometrical center of a corresponding section of the conduit.

34. The method according to claim 25 or claim 33, further comprising the step of:

winding at least one elongated element around said at least one cable.

* * * * *